Aug. 16, 1938.    M. W. ANTHONY    2,127,384
MOTORCYCLE ENGINE TRANSMISSION
Filed May 22, 1936    3 Sheets-Sheet 2

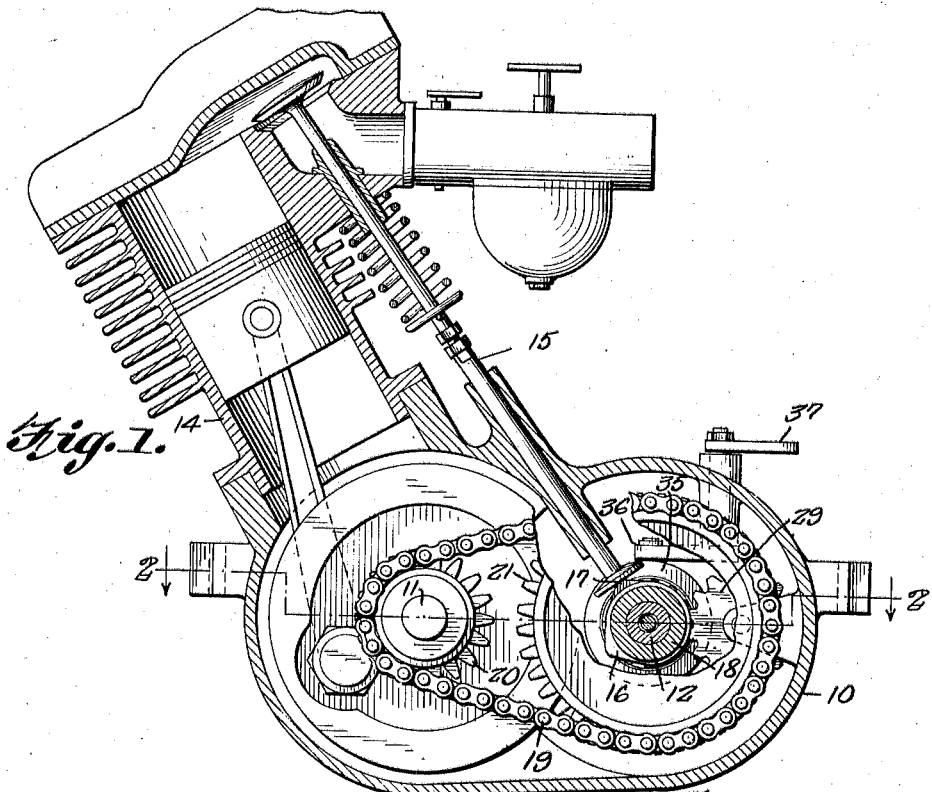

Mark W. Anthony, INVENTOR
BY *Victor J. Evans & Co.*
ATTORNEYS

WITNESS:

Aug. 16, 1938.  M. W. ANTHONY  2,127,384
MOTORCYCLE ENGINE TRANSMISSION
Filed May 22, 1936  3 Sheets-Sheet 3

Mark W. Anthony,
INVENTOR
BY Victor J. Evans & Co.
ATTORNEYS

WITNESS:
P. J. Hickey.

Patented Aug. 16, 1938

2,127,384

UNITED STATES PATENT OFFICE 2,127,384

MOTORCYCLE ENGINE TRANSMISSION

Mark W. Anthony, Tyler, Tex.

Application May 22, 1936, Serial No. 81,317

6 Claims. (Cl. 123—197)

The object of the invention is to provide a motorcycle engine transmission in which the transmission shaft is carried in the crank-case in common with the crank shaft, so that the construction as a whole may be condensed into small compass; to provide a construcion of the kind indicated in which the valve operating cams are carried at the transmission side of the crank-case and rotated in timed relation to the crank shaft; to provide a transmission construction in which the cam shaft is an element of the power shaft but susceptible of being released from the latter; and generally to provide a motorcycle engine construction which is of simple form and therefore susceptible of cheap manufacture.

With this object in view, the invention consists in a construction and combination of parts of which a preferred embodiment is illustrated in the accompanying drawings but to which embodiment the invention is not to be restricted. Continued use in practice may dictate certain changes or alterations and the right is claimed to make any which fall within the scope of the annexed claims.

In the drawings:

Figure 1 is a vertical longitudinal sectional view of a motor vehicle constructed in accordance with the invention.

Figure 2 is a sectional view on the plane indicated by the line 2—2 of Figure 1.

Figure 8 is a sectional view on the plane indicated by the line 8—8 of Figure 3.

Figure 3:
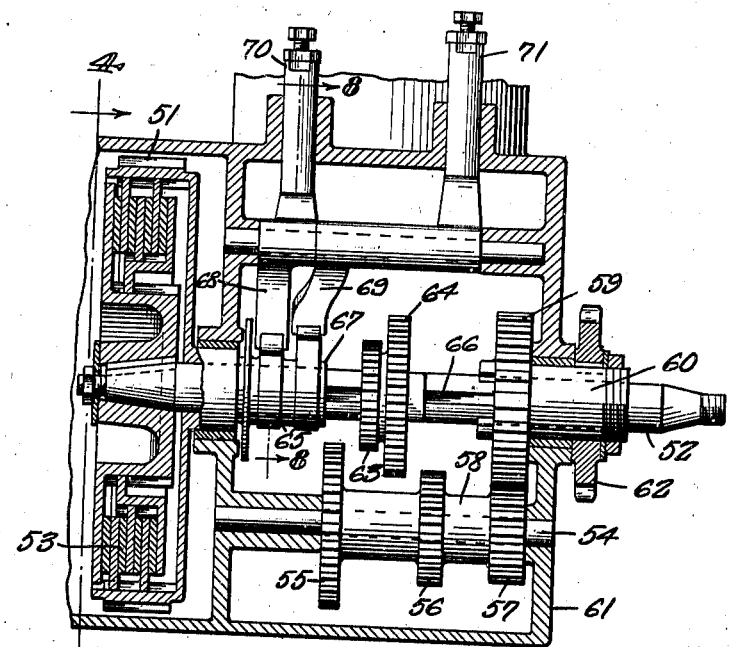
Figure 3 is a transverse vertical sectional view of a modified form, this view being taken in the plane of the vertical diameter of the transmission shaft.
Figure 4:
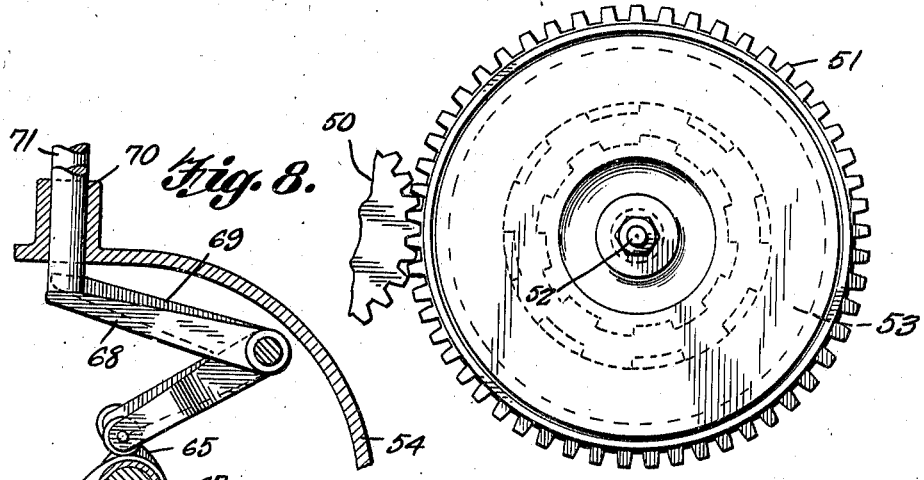
Figure 4 is a sectional view on the plane indicated by the line 4—4 of Figure 3.

The invention contemplates the arrangement in parallel relation and in a common crank-case 10 of the crank shaft 11 and transmission shaft 12 of the engine or motor whose cylinder 14 surmounts the crank-case and is of the usual air cooled variety and equipped with the conventional inlet and exhaust valves actuated by push rods 15 bearing respectively on the cams 16 and 17.

The cams 16 and 17 are formed as elements of a sleeve 18 disposed in surrounding relation to the power transmission shaft 12 and motion is communicated to it through the crank shaft by means of a chain 19 traversing sprockets 20 and 21 mounted respectively on the crank shaft 11 and cam shaft or sleeve 18.

The power shaft 12 is actuated from the cam shaft 18 through the instrumentality of a clutch 22 of the friction disk form whose driving element is carried by the cam shaft 18 and whose driven element is connected with the transmission or power shaft 12, the clutch being kept normally in clutching engagement by means of the springs 23 and being shifted to releasing position by means of a push rod 24 which extends through a bore in the power shaft and carries a ball bearing thrust 25 engaging the spring pressed element of the clutch.

At the end of the power shaft remote from the clutch 22, the push rod projects a sufficient distance to permit axial movement being imparted to it through the instrumentality of a finger 26 which bears on the end of the rod and is designed to be normally actuated by rotating the rod 27 by which it is carried.

Within the crank-case 10 and mounted on a counter-shaft 28 are the counter-shaft gears 29 and 30 which are carried on a common hub and therefore constitute an integral assembly. The gear 28 meshes with a gear 30 formed as an element of a sleeve 31 which surrounds the transmission shaft and rotates relative to the latter but constitutes the journal for this end of the counter-shaft being carried in a bearing 32 in the crank-case and extending through the latter so that it may carry the sprocket 33 over which the vehicle drive chain is trained. When rotary movement is imparted to the gear 30 therefore driving power is communicated to the sprocket 33.

The gear 29 meshes with a gear 34 carried by the transmission shaft 12 relative to which it rotates freely except when clutched to the same. And either it or the gear 30 may be clutched to the transmission shaft since both of these gears, on their facing sides, are formed with clutch elements designed to be selectively engaged with the clutch member 25 which is mounted on the transmission shaft between the gears 30 and 34 and is axially movable of the transmission shaft but precluded from angular or turning movement with respect thereto, as by being keyed to the transmission shaft. Shifting of the clutch member 35 is accomplished by means of the shifter 36 which is provided with any suitable actuating means 37.

The transmission or power shaft 12 extends far enough through the sleeve 31 to provide a mounting for the starting gear 38 which is operatively connected with the transmission shaft through a conventional overrunning clutch 39, or its equivalent, so that if movement is imparted to the gear 38, the transmission shaft will be turned as a result, whereas if the transmission shaft is turning from power derived from the motor, the gear may remain at rest. In mesh with the gear 38 is a segment 40 designed to have an angular or turning movement imparted to it through the starting treadle 41.

In starting the motor, the elements of the clutch 22 will be engaged but the clutch member 35 will be in neutral position. Depression of the started treadle 41 will impart angular movement to the sector 40 which, through the gear 38, will effect angular or turning movement of the transmission shaft 12, turning movement to the cam shaft 18 being imparted through the clutch 22. But with the turning of the cam shaft, the crank shaft will also be turned and the motor will be set in operation. But then the transmission shaft will turn through power derived from the cylinders. Starting of the vehicle is accomplished by first releasing the clutch 22 by actuation of the rod 24 through its finger 26, so that the clutch member 35 may be shifted into engagement with the gear 34, when the sprocket 33 will be turned from its transmission shaft through the gear train 34, 29, 30a and 30, thus giving a lower angular speed to the sprocket 33 than that at which the transmission shaft turns. Shifting to high speed is accomplished by first declutching, as aforesaid, and then shifting the clutch member 35 into engagement with the gear 36, when the angular speed of the sprocket 33 will be the same as that at which the transmission shaft turns.

In that form of the invention illustrated in Figure 3, synchronous operation of the crank shaft and transmission shaft is effected by a positive operative connection between the two which may be in the form of a chain traversing sprockets on the two shafts or in the form of a gear couple of which the driver 50 is carried by the crank shaft and the driven 51 by the transmission shaft 52 exterior to the clutch 53 with which the transmission shaft is equipped. Disposed below the transmission shaft is a countershaft 54 on which are rotatably mounted the gears 55, 56 and 57 which are formed as integral elements of a common sleeve 58 but are spaced from each other. The gear 57 is in mesh with a gear 59 carried by a sleeve 60 which is journaled in appropriate bearings in the transmission case 61, so that the sprocket 62 which carries the vehicle driving chain may be driven thereby. The gear 59 is formed on one side with integral spaced lugs constituting the elements of a clutch. The gears 63 and 64, mounted on a common hub, are carried on the transmission shaft 52 between the cams 65 and the gear 59 and are axially movable of the transmission shaft but not angularly movable thereof, the hub of the gears 63 and 64 carrying a key slidable in a spline 66 formed in the transmission shaft. The gear unit 63—64 may be shifted to mesh the gear 63 with the gear 55 or the gear 64 with the gear 56, or to effect direct clutching with the gear 59, which arrangement provides for low, intermediate and full transmission shaft speed to the sprocket 62.

The clutch 53 is interposed between the transmission shaft 52 and the cam shaft 67 which is in the form of a sleeve loosely surrounding the transmission shaft.

The cams 65 respectively actuate rockers 68 and 69 which in turn respectively actuated the intake and exhaust valve push rods 70 and 71.

Figure 5:
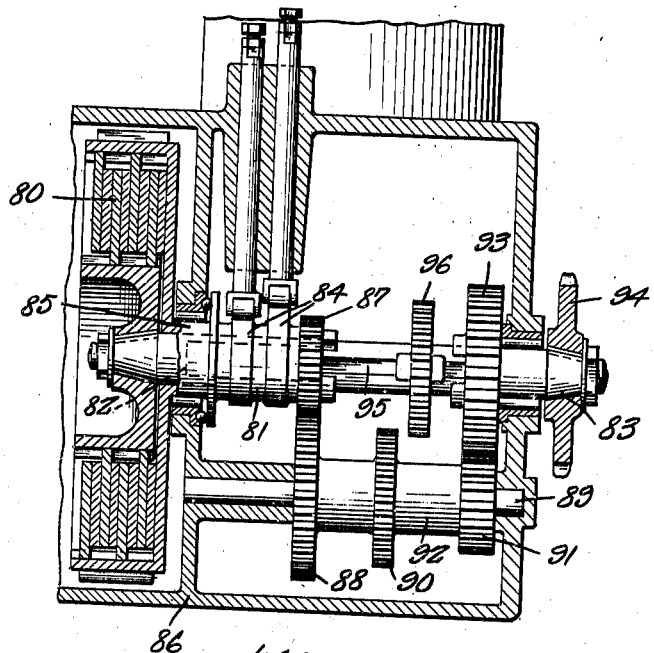
Figure 5 is a view similar to Figure 3 but of still another modification.
Figure 6:
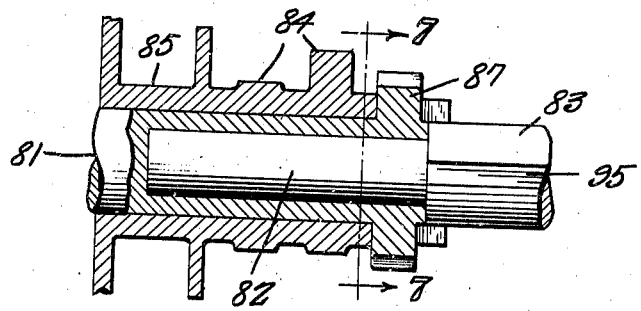
Figure 6 is a detail sectional view of the cam drive illustrated in Figure 5 taken in a vertical plane diametrically of the cam shaft.
Figure 7:
Figure 7 is a sectional view on the plane indicated by the line 7—7 of Figure 6.

In that form of the invention illustrated in Figure 5, the construction is modified to the extent of having the drive clutch 80, which is substantially identical to the drive clutch 53, connected with and driving an element of the transmission shaft, this element being in the form of a short tubular shaft 81 in which the pilot 82 of the main portion of the transmission shaft 83 is received. The cams 84, which operate the valve rockers are identical in contour with the cams 65 which are preferably integrally formed on a sleeve extension 85 of the driving member of the clutch 80, the shaft 81 rotating in the sleeve extension of the clutch, which sleeve extension rotates on anti-friction bearings in the wall of the transmission case 86.

A gear 87 carried at the end of the shaft 81 and integral with or secured thereto is provided with clutch lugs on one side and this gear meshes with the gear 88 on a counter-shaft 89 substantially identical with the counter-shaft 54. The gear 88 is mounted in common with the gears 90 and 91 on a sleeve 92, the gear 91 meshing with a gear 93 floating on the section 83 of the transmission shaft, this portion of the transmission shaft extending to the exterior of the transmission case 86 and carrying the drive sprocket 94. The section 83 of the transmission shaft is splined, as indicated at 95, so that the gear 96, which is mounted on this section of the shaft, may move axially with reference to the transmission shaft but not angularly with respect thereto. The gear 96 is provided with clutch lugs on opposite faces so that it may be interlocked either with the gear 87, or interlocked with the gear 93.

In the construction shown in Figure 5, the countershaft gears are constantly rotating when the clutch is in and the engine in motion but the shaft section 83 is either at rest or in motion, depending on the position of the gear 96. If it is interlocked with the gear 93, the shaft section 83 and drive sprocket 94 rotate at the lowest speed, since the drive is then from the clutch to the gear 87, to the gear 88, the gear 91, gear 93 through the keyed connection to the transmission shaft section 83. Intermediate speed is secured by effecting meshing of the gear 96 with the gear 90; high speed by interlocking the gears 96 and 87.

The invention having been described, what is claimed as new and useful is:

1. Mechanism for the purpose indicated comprising a crank shaft, a rotary member operatively connected with the crank shaft for rotation in timed relation with the latter, valve operating cams mounted on the rotary member for actuating inlet and exhaust valves, a transmission shaft having its axis of rotation in common with that of said member and operative connections between said member and the transmission shaft for controlling rotation of the latter independently of the cams.

2. Mechanism for the purpose indicated comprising a crank-case, a crank shaft mounted in the crank case, a transmission shaft mounted in the crank-case in parallelism with the crank shaft, a sleeve member surrounding and rotating relative to the transmission shaft operative connections between the sleeve member and crank shaft to drive the two in timed relation, valve cams mounted on the sleeve member, and a clutch interposed between the sleeve member and the transmission shaft to control the latter independently of the cams.

3. Mechanism for the purpose indicated comprising a crank shaft, a transmission shaft arranged parallel to and operatively connected with the crank shaft to be driven by the latter, valve operating cams having axes of rotation coincident with the axis of the transmission shaft and operatively connected with the crank shaft to be driven in timed relation with the latter, and means releasably effecting an operative connection between the crank shaft and said transmission shaft.

4. Mechanism for the purpose indicated comprising a crank shaft, a transmission shaft, a casing enclosing the two, valve actuating cams mounted coaxially on the transmission shaft, releasable operative connections between the cams and the transmission shaft, and a positive driving connection between the crank shaft and the cams.

5. Mechanism for the purpose indicated comprising a crank-case, a crank shaft rotatably mounted in the crank-case, a transmission shaft, a sleeve surrounding said transmission shaft and formed with valve operating cams, a positive driving connection between the crank shaft and the cam sleeve, a clutch operatively connecting the cam sleeve with the transmission shaft, a transmission sprocket, and selective transmission gearing operatively connecting the transmission shaft with said sprocket.

6. Mechanism for the purpose indicated comprising a crank case, a crank shaft rotatably mounted in the crank case, a sleeve paralleling the crank shaft and rotatably mounted in the crank case, positive driving connections between the crank shaft and sleeve to effect movement of the latter in timed relation with the former, valve actuating cams formed on the sleeve, a transmission shaft surrounded by the sleeve, a clutch controlled driving connection between the sleeve and the transmission shaft, a counter-shaft paralleling the transmission shaft, a series of gears of different diameters carried on the counter-shaft, gears carried on the transmission shaft and arranged in couples with those on the counter-shaft, and means for selectively effecting positive driving connections with the transmission shaft of those gears carried by the latter.

MARK W. ANTHONY.